(12) United States Patent
Slaney et al.

(10) Patent No.: US 10,982,597 B2
(45) Date of Patent: Apr. 20, 2021

(54) ISOLATION SEALS FOR GAS TURBINE ENGINES

(71) Applicant: United Technologies Corporation, Farmington, CT (US)

(72) Inventors: Brandon T. Slaney, Wethersfield, CT (US); Michael Joseph Murphy, Windsor, CT (US); Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 62 days.

(21) Appl. No.: 16/431,962

(22) Filed: Jun. 5, 2019

(65) Prior Publication Data

US 2020/0386166 A1 Dec. 10, 2020

(51) Int. Cl.
*F02C 7/28* (2006.01)
*F01D 11/00* (2006.01)
*F01D 25/14* (2006.01)

(52) U.S. Cl.
CPC .............. *F02C 7/28* (2013.01); *F01D 11/003* (2013.01); *F01D 25/14* (2013.01); *F05D 2240/14* (2013.01); *F05D 2240/55* (2013.01); *F05D 2300/437* (2013.01)

(58) Field of Classification Search
CPC .... F02C 7/20; F02C 7/28; F01D 25/14; F01D 11/003; F05D 2240/55; F05D 2240/14; F05D 2250/611; F02K 1/80; F02K 1/805; F02K 1/82; F02K 9/34; F02K 9/343; F02K 9/346; F02K 9/40
See application file for complete search history.

(56) References Cited

U.S. PATENT DOCUMENTS

| | | | |
|---|---|---|---|
| 2,613,087 A | 10/1952 | Alford | |
| 2,940,692 A | 6/1960 | Henry et al. | |
| 3,358,440 A * | 12/1967 | Freid | F02C 7/20 60/791 |
| 5,134,844 A * | 8/1992 | Lee | F01D 5/08 60/806 |
| 9,284,889 B2 * | 3/2016 | Damgaard | F02C 7/28 |
| 9,650,919 B2 | 5/2017 | Whitty et al. | |

(Continued)

FOREIGN PATENT DOCUMENTS

| | | | |
|---|---|---|---|
| DE | 3223082 A1 * | 12/1983 | ............. F16L 51/02 |
| EP | 2594744 A2 | 5/2013 | |
| JP | 4031726 B2 | 1/2008 | |

OTHER PUBLICATIONS

Translation of DE3223082A1 courtesy of Espacenet.com; Temple, Bernhard; Dec. 1983.*

(Continued)

*Primary Examiner* — David E Sosnowski
*Assistant Examiner* — Danielle M. Christensen
(74) *Attorney, Agent, or Firm* — Cantor Colburn LLP (57) ABSTRACT

Isolation seals for gas turbine engines are described. The isolation seals include an elastomer body configured to be attached to a first case structure at a first end and a second case structure at a second end and a seal shield configured to be attached to the first case structure, the seal shield having a shielding member configured to define a protected space between the shielding member and the elastomer body.

16 Claims, 9 Drawing Sheets

(56) References Cited

U.S. PATENT DOCUMENTS

2006/0197287 A1\* 9/2006 Farah .................. F01D 25/30
 277/549
2009/0140497 A1 6/2009 Roberts
2017/0335971 A1\* 11/2017 Barger ................ F16J 15/363

OTHER PUBLICATIONS

European Search Report for European Application No. 20167376.1, International Filing Date Mar. 31, 2020, dated Sep. 18, 2020, 8 pages.

\* cited by examiner

ISOLATION SEALS FOR GAS TURBINE ENGINES

STATEMENT REGARDING FEDERALLY SPONSORED RESEARCH OR DEVELOPMENT

This invention was made with Government support awarded by the United States. The Government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The components of the gas turbine engine are mounted and housed within an engine case. The engine case may then be mounted, attached, or otherwise affixed to an airframe case. The airframe case may be part of or attached to an aircraft (e.g., a wing of an aircraft or aft portion of an aircraft). The airframe case may include elements such as thrust reversers, flaps, vents, and an exhaust nozzle. The exhaust nozzle is designed to direct output of the gas turbine engine away from the aircraft for the purpose of flight. The engine case and the airframe case are coupled together and a seal is used to prevent the hot gases of the gas turbine engine from ingesting into the airframe case. At the coupling, one or more seals may be used, which are configured to maintain and ensure the coupling between the two cases and to prevent hot gases from damaging other components (i.e., keep the hot gases directed toward and out the nozzle).

Elastomer isolation seals can enable assembly and mounting of an engine case and an exhaust portion of the airframe case to be mounted independently. Such elastomer isolation seals can absorb deflections in six degrees of freedom and may be substantially immune to deflections related to ducts and the cases. Moreover, the elastomer isolation seals can reduce overboard leakage to nearly zero, providing thrust and Thrust Specific Fuel Consumption ('TSFC') efficiencies. However, the temperatures at which these elastomer isolation seals must operate are beyond the material capability. That is, during operation, an isolation seal formed from an elastomer will typically fail due to the high temperature of operation. As such, as temperatures continue to increase in gas turbine engine operations, elastomer seals are less practical. Thus, an alternative may be advantageous to enable freedom of movement/deflection between cases while also reducing or eliminating leakage.

BRIEF DESCRIPTION

According to some embodiments, isolation seals for gas turbine engines are provided. The isolation seals include an elastomer body configured to be attached to a first case structure at a first end and a second case structure at a second end and a seal shield configured to be attached to the first case structure, the seal shield having a shielding member configured to define a protected space between the shielding member and the elastomer body.

In addition to one or more of the features described above, or as an alternative, further embodiments of the isolation seals may include a reinforcement band configured to support and retain the elastomer body.

In addition to one or more of the features described above, or as an alternative, further embodiments of the isolation seals may include that the shielding member has a flow director portion on an end thereof.

In addition to one or more of the features described above, or as an alternative, further embodiments of the isolation seals may include that the shielding member is hollow body having a cooling manifold and cooling channels formed therein.

In addition to one or more of the features described above, or as an alternative, further embodiments of the isolation seals may include a plurality of cooling apertures configured to allow a cooling flow to pass from the cooling manifold, through the cooling channels, and out through the cooling apertures.

In addition to one or more of the features described above, or as an alternative, further embodiments of the isolation seals may include that the elastomer body is formed from at least one of room-temperature-vulcanizing silicone, silicone-based material, multi-directional fiber layer reinforced structure, or rubber impregnated fabric.

In addition to one or more of the features described above, or as an alternative, further embodiments of the isolation seals may include that the shielding member is formed from at least one of titanium alloy, nickel alloy, cobalt alloy, or stainless steel.

According to some embodiments, gas turbine engines are provided. The gas turbine engines include a first case structure, a second case structure, an elastomer isolation seal arranged between the first case structure and the second case structure and provide sealing engagement therebetween, the elastomer isolation seal having an elastomer body, and a seal shield configured attached to the first case structure, the seal shield having a shielding member configured to define a protected space between the shielding member and the elastomer body.

In addition to one or more of the features described above, or as an alternative, further embodiments of the gas turbine engines may include a reinforcement band configured to support and retain the elastomer body.

In addition to one or more of the features described above, or as an alternative, further embodiments of the gas turbine engines may include that the shielding member has a flow director portion on an end thereof.

In addition to one or more of the features described above, or as an alternative, further embodiments of the gas turbine engines may include that the shielding member is hollow body having a cooling manifold and cooling channels formed therein.

In addition to one or more of the features described above, or as an alternative, further embodiments of the gas turbine engines may include a plurality of cooling apertures configured to allow a cooling flow to pass from the cooling manifold, through the cooling channels, and out through the cooling apertures.

In addition to one or more of the features described above, or as an alternative, further embodiments of the gas turbine engines may include a cooling source and a cooling supply aperture formed in the first case structure, wherein the cooling supply aperture defines a fluid connection between the cooling source and the protected space.

In addition to one or more of the features described above, or as an alternative, further embodiments of the gas turbine engines may include that the cooling source is a bypass duct of the gas turbine engine at a location upstream of a combustor section.

In addition to one or more of the features described above, or as an alternative, further embodiments of the gas turbine engines may include that the shielding member extends from the first case structure to the second case structure.

In addition to one or more of the features described above, or as an alternative, further embodiments of the gas turbine engines may include a secondary seal arranged between the shielding member and the second case structure.

In addition to one or more of the features described above, or as an alternative, further embodiments of the gas turbine engines may include that the secondary seal is a perforated finger seal.

In addition to one or more of the features described above, or as an alternative, further embodiments of the gas turbine engines may include that the elastomer isolation seal is connected to the first case structure at a first attachment structure and to the second case structure at a second attachment structure.

In addition to one or more of the features described above, or as an alternative, further embodiments of the gas turbine engines may include that the seal shield is attached to the first case structure at the first attachment structure.

In addition to one or more of the features described above, or as an alternative, further embodiments of the gas turbine engines may include that the first case structure is an engine case and the second case structure is an exhaust nozzle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
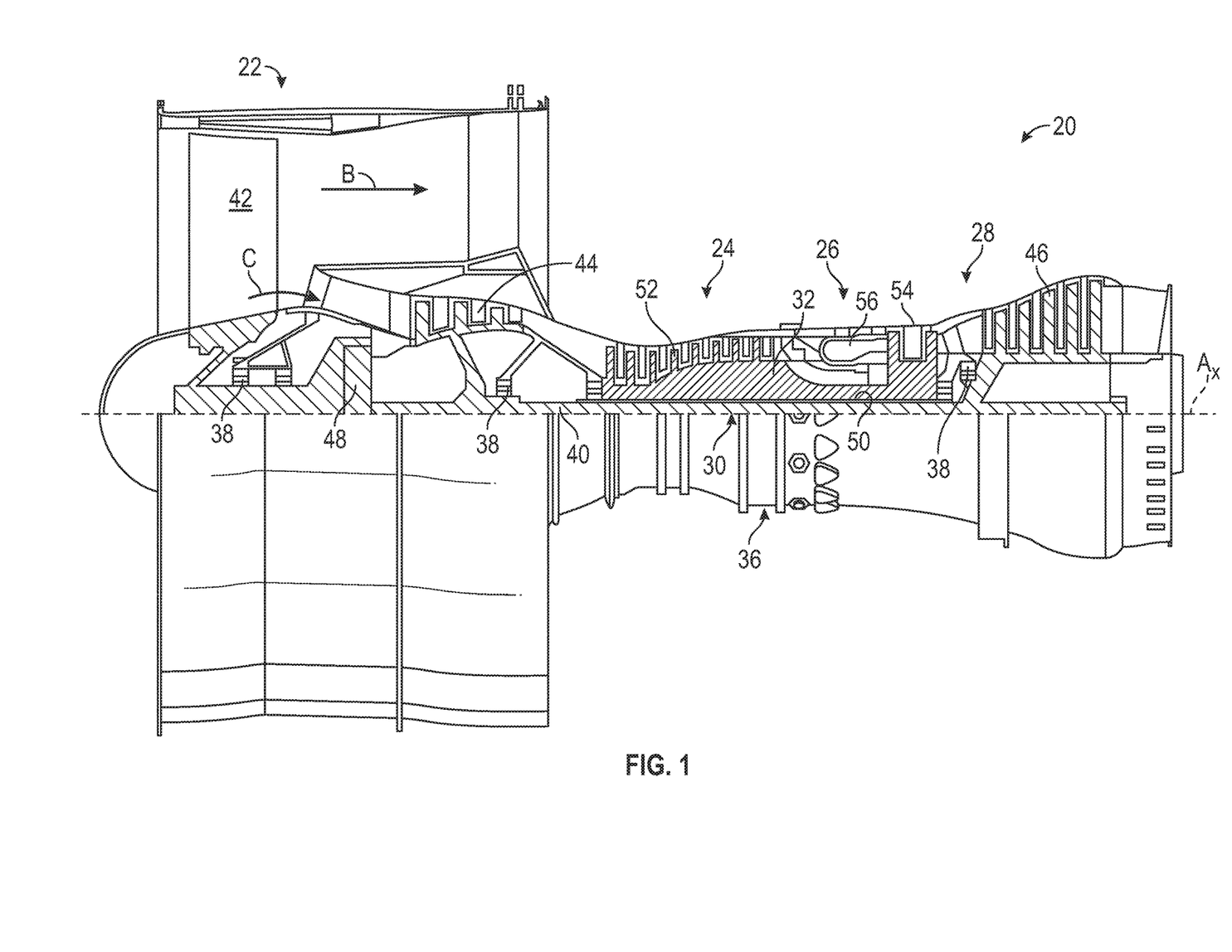
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis $A_x$). An A-R-C axis is shown throughout the drawings to illustrate the relative position of various components.

The exemplary engine 20 generally includes a low speed spool 30 and a high speed spool 32 mounted for rotation about the engine central longitudinal axis $A_x$ relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
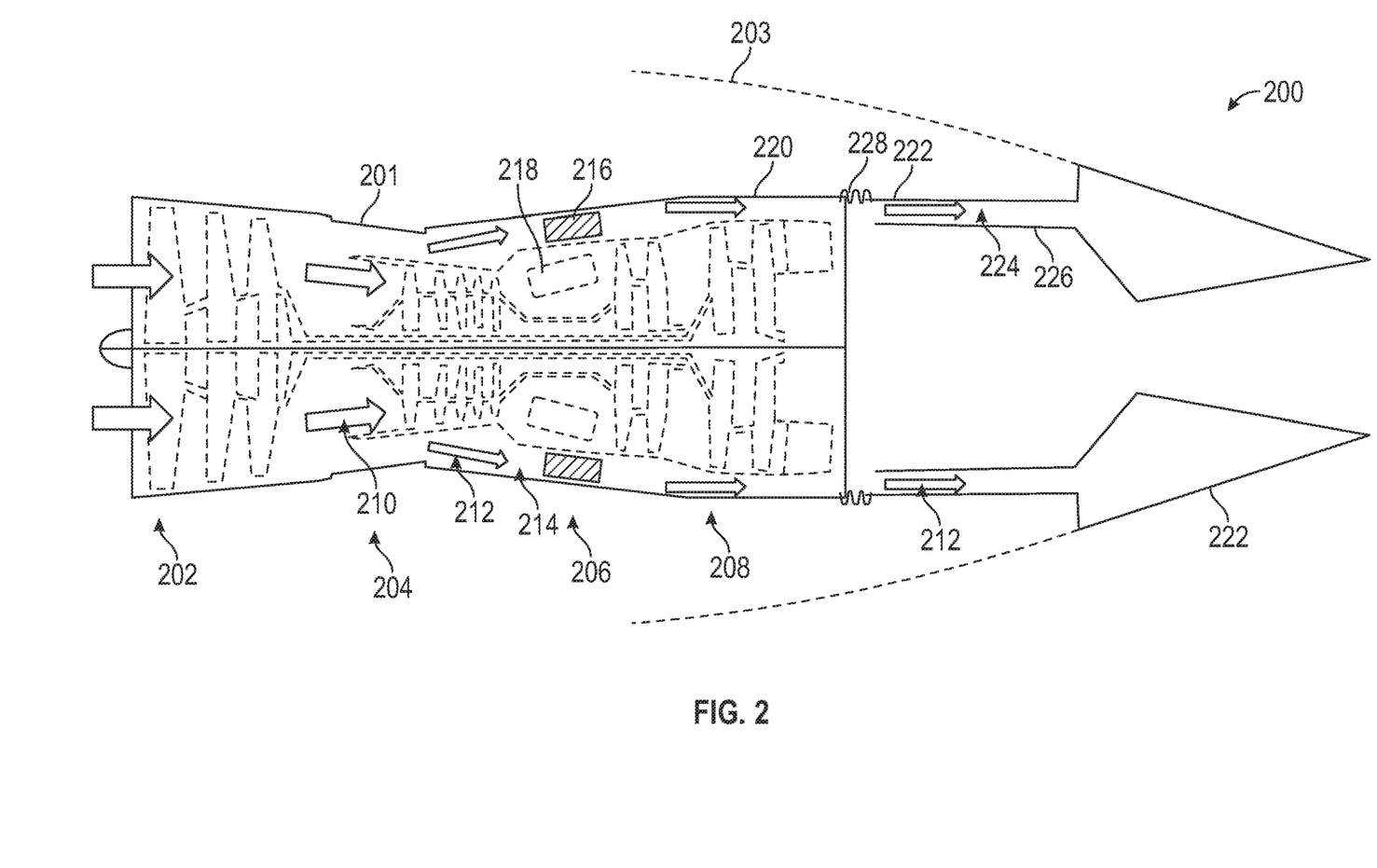
FIG. 2 is a schematic illustration of an engine that may incorporate embodiments of the present disclosure.

Turning now to FIG. 2, a schematic illustration of an engine 200 is shown. The engine 200 may be similar to that shown and described with respect to FIG. 1, with the engine 200 having gas turbine engine 201 having a fan section 202, a compressor section 204, a combustor section 206, and a turbine section 208. A core flow of air 210 will be directed into the compressor section 204 and into the combustor section 206, as will be appreciated by those of skill in the art. A bypass flow of air 212 be directed into a bypass duct 214. The bypass duct 214 may include a heat exchanger 216 to enable cooling, such as to a combustor 218 of the combustor section 206. The air within the bypass duct 214 will thus be heated by absorbing thermal energy from around the combustor section 206. The sections 202, 204, 206, 208 of the gas turbine engine 201 may be housed within an engine case 220, as will be appreciated by those of skill in the art.

The gas turbine engine 201 is housed within an airframe case 203. The airframe case 203 may be configured to mount to an aircraft body (e.g., on a wing or within a central frame of an aircraft). The airframe case 203 includes an exhaust nozzle 222 which is configured to direct and channel an exhaust from the gas turbine engine 201. As illustratively shown, the bypass flow of air 212 is directed into a portion of the exhaust nozzle 222. For example, the exhaust nozzle 222 may define an outer exhaust duct 224 that receives the bypass flow of air 212. The outer exhaust duct 224 may be defined, in part, by an inner exhaust liner 226. The exhaust nozzle 222 may be variable or fixed, as will be appreciated by those of skill in the art.

The exhaust nozzle 222 of the airframe case 203 is attached to the engine case 220 by an isolation seal 228. The isolation seal 228 may be a single piece or group of pieces/components that form an annular seal to join the exhaust nozzle 222 of the airframe case 203 to the engine case 220. The isolation seal 228 may be formed from various suitable materials, including, but not limited to metals and/or elastomers. As noted above, an elastomeric isolation seal may be difficult to implement due to thermal limitations of the elastomer materials.

As discussed above, elastomer isolation seals can enable assembly and mounting of an engine case and an exhaust portion of the airframe case to be mounted independently. Such elastomer isolation seals can absorb deflections in six degrees of freedom and may be substantially immune to deflections of ducts and/or the cases. Moreover, the elastomer isolation seals can reduce overboard leakage to nearly zero, providing thrust and Thrust Specific Fuel Consumption (' TSFC') efficiencies. However, the temperatures at which these elastomer isolation seals must operate is beyond material capability. That is, during operation, an isolation seal formed from an elastomer will typically fail due to the high temperature of operation. As such, as temperatures continue to increase in gas turbine engine operations, elastomer seals are less practical.

Embodiments described herein are directed to enabling elastomer isolation seals to be employed, even in high-temperature systems (e.g., 400° F., 450° F., 500° F., 550° F. or greater). In accordance with some embodiments of the present disclosure, shielded elastomer isolation seals are provided. The shielding can provide thermal protection to an elastomer isolation seal and thus prevent material fatigue or failure of the elastomer. As such, elastomer isolation seals may be used in high-temperature operating conditions of gas turbine engines. In some non-limiting examples, without limitation, room-temperature-vulcanizing silicone, other silicone-based materials, multi-directional fiber layer (e.g., woven or braided) reinforced structure, and/or rubber impregnated fabrics may be employed as the elastomeric material of elastomer isolation seals of the present disclosure. In some embodiments, an elastomer isolation seal may be a fabric-reinforced composite material.

Figure 3:
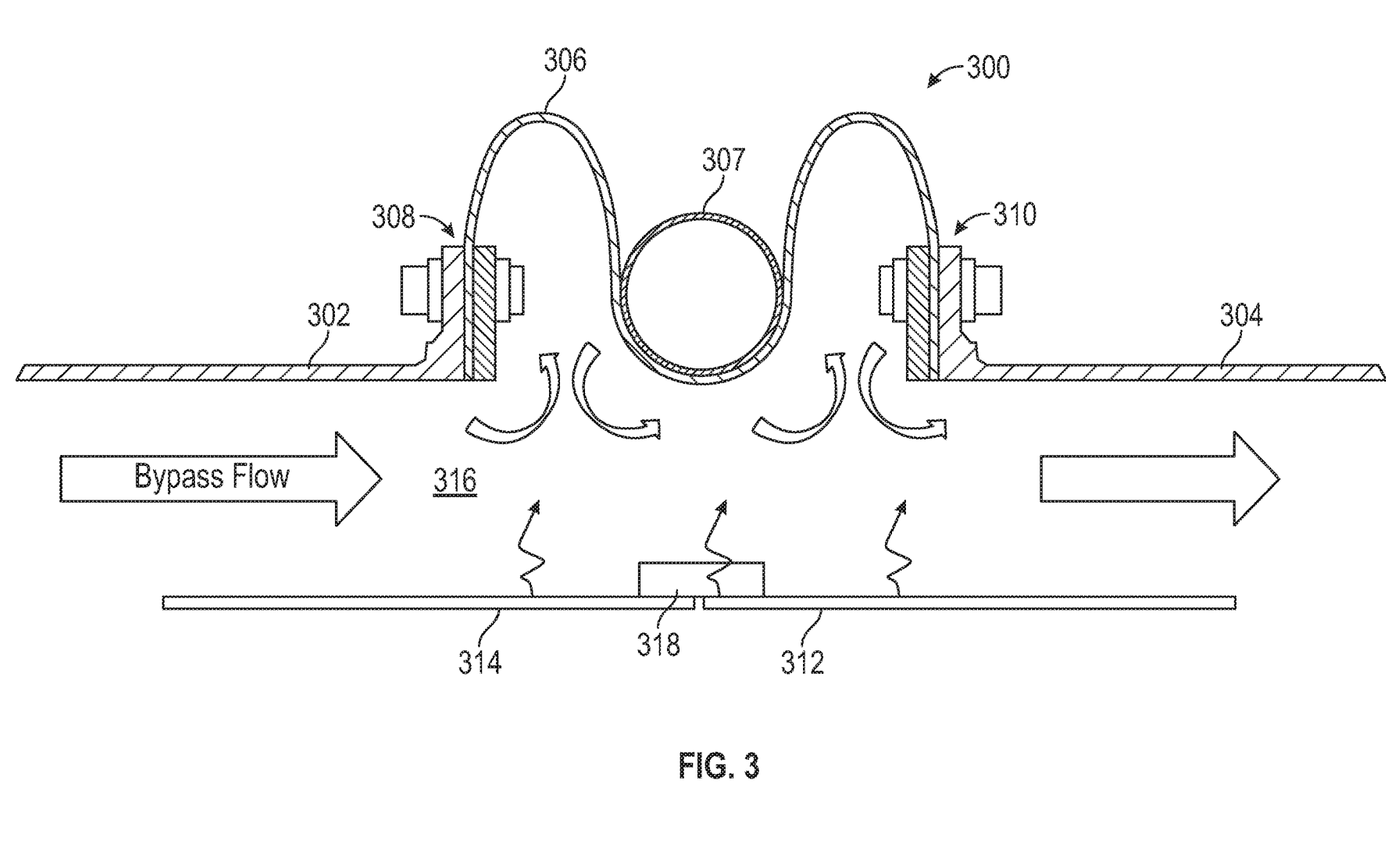
FIG. 3 is a schematic illustration of an elastomer isolation seal of a gas turbine engine that may incorporate embodiments of the present disclosure.

FIG. 3 illustrates the thermal conditions at the location of an elastomer isolation seal 300 during operation of a gas turbine engine. The elastomer isolation seal 300 is configured to movably join and connect an engine case 302 and an exhaust nozzle 304, as described above. The elastomer isolation seal 300 has an elastomer body 306 that attaches at one end to the engine case 302 at a first attachment structure 308 and attaches at another end to the exhaust nozzle 304 at a second attachment structure 310. The first and second attachment structures 308, 310 may include, without limitation, flanges, fasteners, adhesives, welds, etc. to structurally and/or fixedly connect and attach the elastomer body 306 to the engine case 302 and the exhaust nozzle 304.

As shown, the elastomer body 306 includes one or more undulations to allow for expansion, contraction, axial relative movement, radial relative movement, and/or rotational/angular relative movement between the engine case 302 and the exhaust nozzle 304. One or more reinforcement bands 307 may be arranged with the elastomer body 306 to form the undulations and to provide structural rigidity to the elastomer body 306. For example, the reinforcement band 307 may retain and prevent the elastomer body 306 from expanding or ballooning outward due to a pressure differential on either side of the elastomer body 306.

The elastomer isolation seal 300 is a full-hoop or circular structure that extends a full circumference about an engine at the location of the joining of the engine case 302 and the exhaust nozzle 304. As shown in FIG. 3, the exhaust nozzle 304 is mounted to a portion of the engine case 302 at least in part by the elastomer isolation seal 300. An inner exhaust liner 312 and a bypass liner 314 define, in part, a bypass duct 316 for bypass air to flow through. The inner exhaust liner 312 may be sealed to the bypass liner 314 by a flowpath seal 318. At the joining or connection of the exhaust nozzle 304 and the engine case 302 is the elastomer isolation seal 300. The full-hoop elastomer isolation seal 300 is configured to absorb the rotation degrees of freedom, translate axially, and accommodate radial deflection between the engine case 302 and the exhaust nozzle 304.

As noted, the elastomer isolation seal 300 is arranged at a junction between the engine case 302 and the exhaust nozzle 304. Further, the elastomer isolation seal 300 is arranged along the bypass duct 316. As such, the elastomer isolation seal 300 will be subject to a bypass flow of air which will have been heated, in part, by a heat exchanger or other components of the gas turbine engine. This hot bypass air will thermally interact with the elastomeric material of the elastomer body 306. Moreover, liner radiated heat, from the inner exhaust liner 312 and the bypass liner 314, will further increase the temperatures to which the elastomer body 306 may be subject to.

Figure 4:
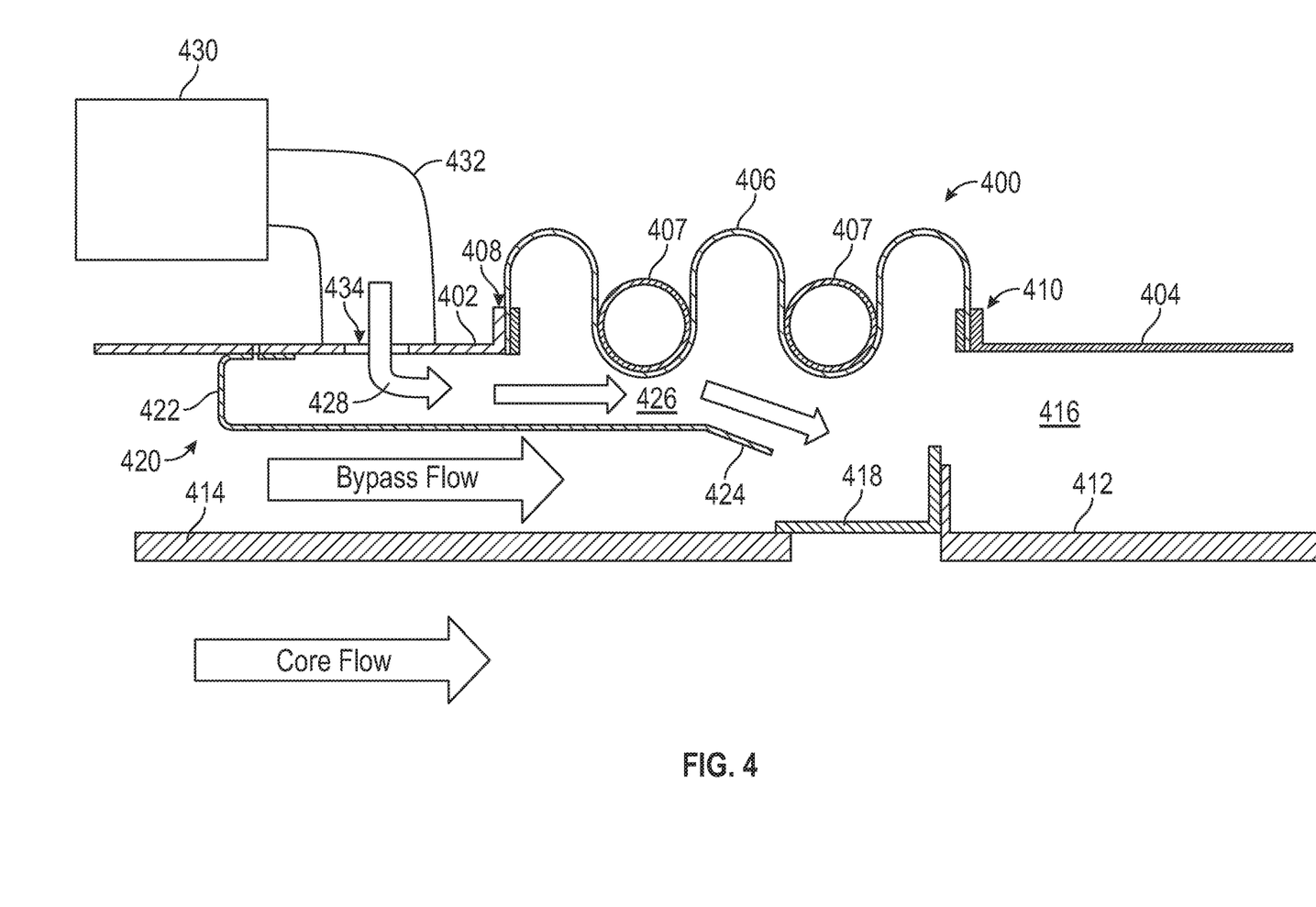
FIG. 4 is a schematic illustration of an elastomer isolation seal and seal shield in accordance with an embodiment of the present disclosure.

Turning now to FIG. 4, a schematic illustration of an elastomer isolation seal 400 during operation of a gas turbine engine in accordance with an embodiment of the present disclosure. The elastomer isolation seal 400 is configured to movably join and connect an engine case 402 and an exhaust nozzle 404, as described above. The elastomer isolation seal 400 has an elastomer body 406 that attaches at one end to the engine case 402 at a first attachment structure 408 and attaches at another end to the exhaust nozzle 404 at a second attachment structure 410.

As shown, the elastomer body 406 includes one or more undulations to allow for expansion, contraction, axial relative movement, radial relative movement, and/or rotational/angular relative movement between the engine case 402 and the exhaust nozzle 404. One or more reinforcement bands 407 may be arranged with the elastomer body 406 to form the undulations and to provide structural rigidity to the elastomer body 406. For example, the reinforcement bands 407 may prevent the elastomer body 406 from expanding or ballooning outward due to a pressure differential on either side of the elastomer body 406.

The elastomer isolation seal 400 is a full-hoop or circular structure that extends a full circumference about an engine at the location of the joining of the engine case 402 and the exhaust nozzle 404. As shown in FIG. 4, the exhaust nozzle 404 is mounted to a portion of the engine case 402 at least in part by the elastomer isolation seal 400. An inner exhaust liner 412 and a bypass liner 414 define, in part, a bypass duct 416 for bypass air to flow through. The inner exhaust liner 412 may be sealed to the bypass liner 414 by a flowpath seal 418. The full-hoop elastomer isolation seal 400 is configured to absorb the rotation degrees of freedom, translate axially, and accommodate radial deflection between the engine case 402 and the exhaust nozzle 404.

In this embodiment, the elastomer isolation seal 400 is protected by a seal shield 420. The seal shield 420 includes a shielding member 422 that is attached to (or part of) the engine case 402 and extending into the bypass duct 416 to shield the elastomer body 406 from the hot gases within the bypass duct 416. The shielding member 422 may be a full-hoop structure that extends around the entire circumference of the engine and shields the elastomer isolation seal 400. The shielding member 422 may be formed from a metal or other high temperature material that can withstand the thermal conditions within the bypass duct 416. In some non-limiting examples, the shielding member of some embodiments may be formed from titanium alloys, nickel alloys, cobalt alloys, or stainless steel. The shielding member 422 is shaped to prevent the bypass flow through the bypass duct 416 from directly impacting the elastomer isolation seal 400. In some embodiments, and as shown, the shielding member 422 can include a flow director portion 424 to discourage the hot bypass flow air from ingesting into a protected space 426. The protected space 426 is defined by the shielding member 422 and the elastomer isolation seal 400 and is a volume of air that insulates the elastomer isolation seal 400 from the hot gas in the bypass duct 416.

In this embodiment, the protected space 426 is injected with a cooling air 428. The cooling air 428 provides additional thermal protection to the elastomer isolation seal 400 and can also prevent ingestion of hot gases into the protected space 426. The cooling air 428 is air at a temperature less than the temperature of the bypass flow within the bypass duct 416. The cooling air 428 may be selected and controlled to enable operation and functionality of the elastomer isolation seal 400 within the high-temperature operation and conditions of a gas turbine engine.

The cooling air 428 may be sourced from one or more locations on the gas turbine engine or at other locations on an aircraft. The cooling air 428 is sourced from a cool air source 430 and is supplied through a supply duct 432 to one or more cooling supply apertures 434 formed in the engine case 402 proximate the elastomer isolation seal 400. In some embodiments, the cool air source 430 may be a location along the bypass duct 416 upstream of a heat exchanger and/or upstream of a combustor section of the gas turbine engine, such that the air within the bypass duct 416 has not been heated excessively by components of the gas turbine engine.

As shown in FIG. 4, the shielding member 422 extends an axial distance to at least partially shield the elastomer body 406 of the elastomer isolation seal 400. That is, in some embodiments, the shielding member 422 may not fully cover or extend the same axial length as the elastomer body 406. In other embodiments, the shielding member 422 may extend axial the same or longer in distance than the elastomer body 406.

In some embodiments, the shielding member 422 may be configured to be a distance away from the elastomer body 406 in the radial direction (relative to an engine axis) such that radial offset or deflection between the engine case 402 and the exhaust nozzle 404 does not cause contact between the shielding member 422 and the elastomer body 406. That is, the shielding member 422 may be sized, shaped, and arranged to ensure full operation and functionality of the elastomer isolation seal 400 and does not interfere and/or damage the elastomer isolation seal 400 during operation.

Figure 5A:
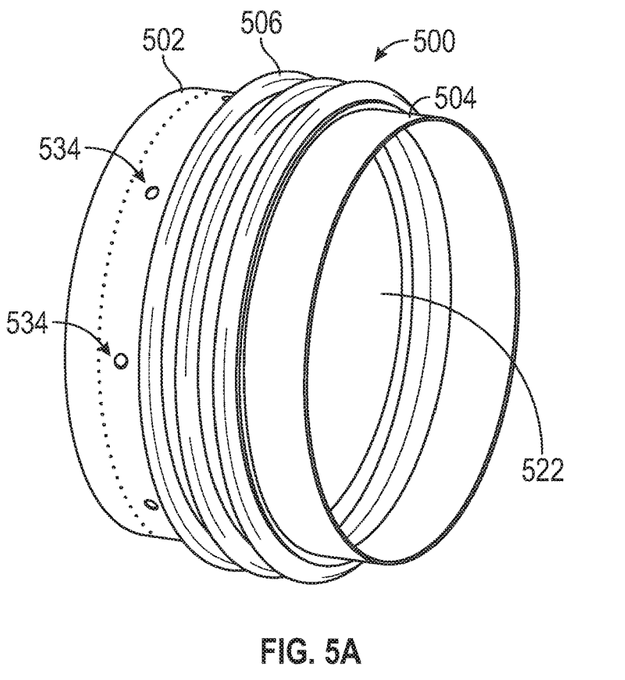
FIG. 5A is an isometric illustration of an elastomer isolation seal and seal shield in accordance with an embodiment of the present disclosure.
Figure 5B:
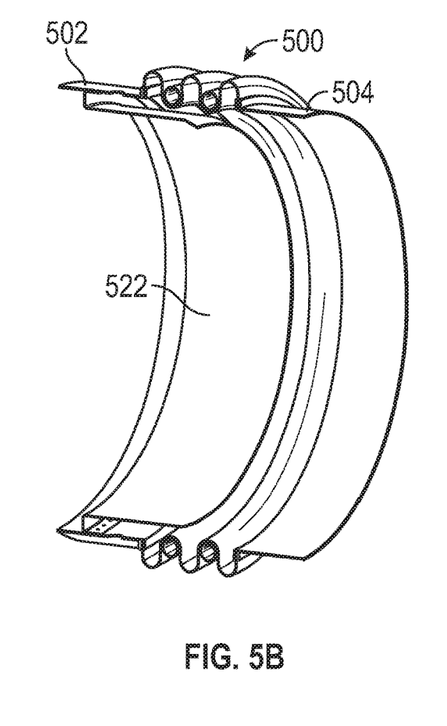
FIG. 5B is an isometric partial cutaway illustration of the elastomer isolation seal and seal shield of FIG. 5A.
Figure 5C:
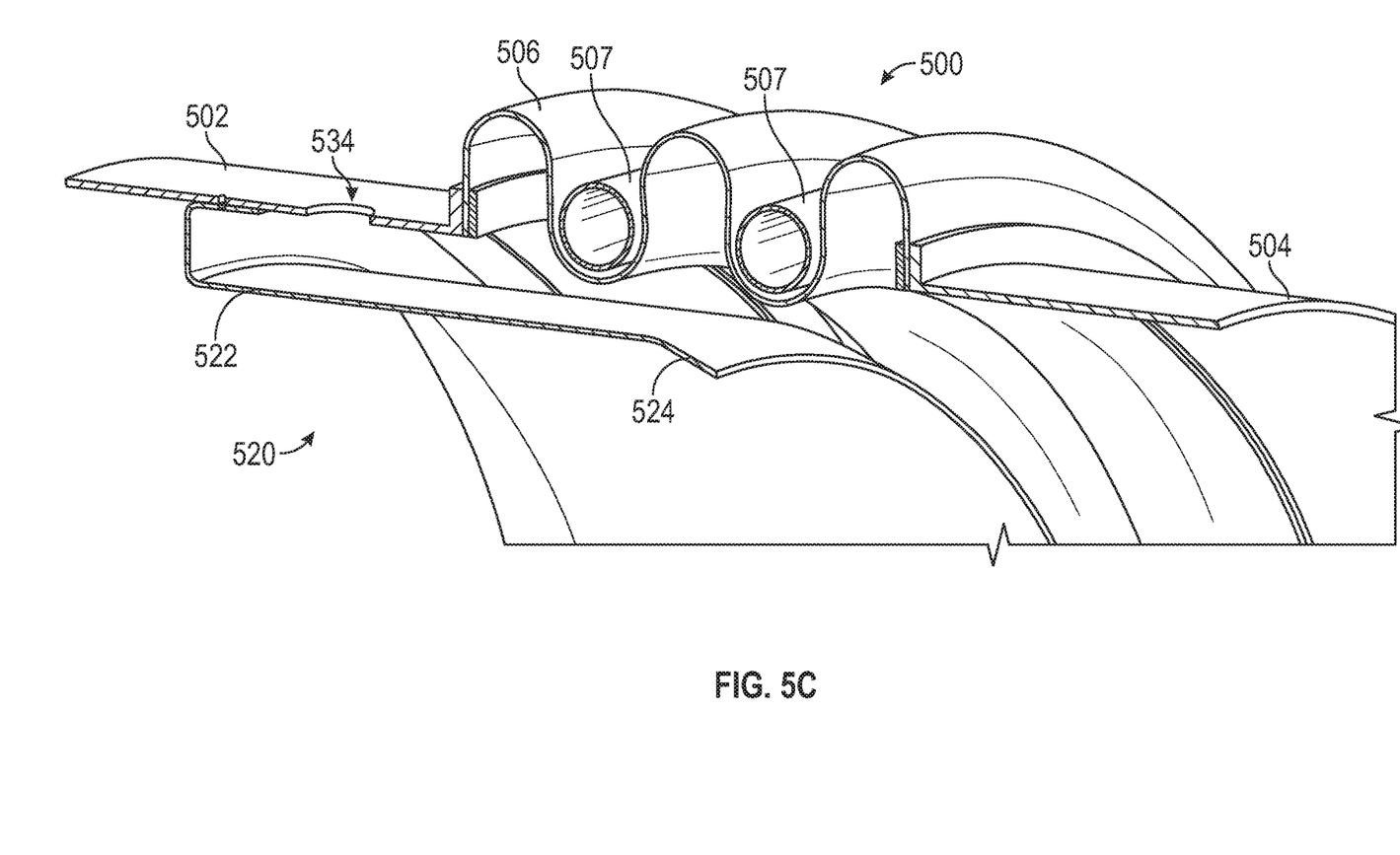
FIG. 5C is an enlarged illustration of the partial cutaway of FIG. 5B.

Turning now to FIGS. 5A-5C, schematic illustrations of an elastomer isolation seal 500 in accordance with an embodiment of the present disclosure are shown. The elastomer isolation seal 500 of FIGS. 5A-5C may be substantially similar to that shown and described in FIG. 4, and thus similar features and/or structures may not be labeled and/or described again, for clarity and ease of description. The elastomer isolation seal 500 includes an elastomer body 506 that is reinforced and retained by reinforcement bands 507. The elastomer body 506 is configured to join, and seal, a connection between an engine case 502 and an exhaust nozzle 504.

In this embodiment, the elastomer isolation seal 500 is protected by a seal shield 520 having a shielding member 522. The shielding member 522 is attached to (or part of) the engine case 502 and extends afterward in an axial direction to shield the elastomer body 506. The shielding member 522, as shown, is a full-hoop structure that extends around the entire circumference of the engine and shields the elastomer isolation seal 500. The shielding member 522 may be formed from a metal or other high temperature material that can withstand the thermal conditions of operation of a gas turbine engine. The shielding member 522 includes a flow director portion 524 to discourage the hot bypass flow air from negatively impacting the elastomer isolation seal 500. A plurality of cooling supply apertures 534 formed in the engine case 502 proximate the elastomer isolation seal 500 to enable supply of a cooling air to the elastomer isolation seal 500.

Figure 6:
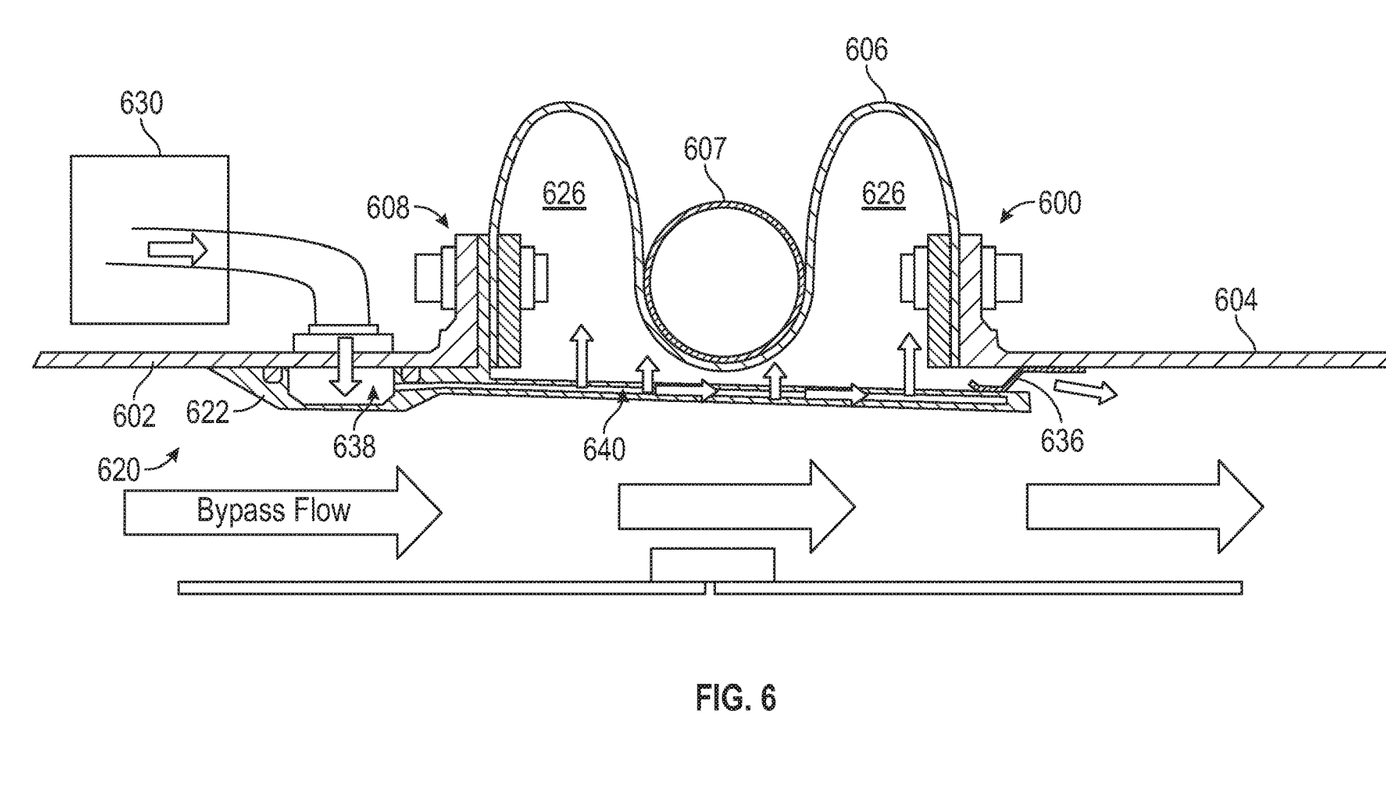
FIG. 6 is a schematic illustration of an elastomer isolation seal and seal shield in accordance with an embodiment of the present disclosure.

Turning now to FIG. 6, a schematic illustration of an elastomer isolation seal 600 in accordance with an embodiment of the present disclosure is shown. The elastomer isolation seal 600 of FIG. 6 may be substantially similar to that shown and described above, and thus similar features and/or structures may not be labeled and/or described again, for clarity and ease of description. The elastomer isolation seal 600 includes an elastomer body 606 that is reinforced and retained by reinforcement bands 607. The elastomer isolation seal 600 is configured to join or connect a first case structure 602 and a second case structure 604. The first case structure 602 may be an engine case and the second case structure 604 may be an exhaust nozzle, as shown and described above. In other embodiments, the first and second case structures 602, 604 may be any case component, ducting, etc. of a gas turbine engine that is connected and relative movement between the two may be possible during operation.

In this embodiment, a seal shield 620 having a shielding member 622 is provided to thermally protect the elastomer isolation seal 600. In this embodiment, the shielding member 622 is connected and part of an attachment structure 608 that connects the elastomer isolation seal 600 to the first case structure 602 at a first end of the elastomer isolation seal 600. In this embodiment, the shielding member 622 extends a full distance or length, in an axial direction, from the first case structure 602 to the second case structure 604. The shielding member 622 defines one or more protected spaces 626 between the shielding member 622 and the elastomer body 606 of the elastomer isolation seal 600. The shielding member 622 may contact the second case structure 604 or an optional secondary seal 636 may be arranged between a portion of the shielding member 622 and the second case structure 604. In some embodiments, the secondary seal 636 may be a perforated finger seal that allows for air within the protected space 626 to flow into the bypass flow.

In some embodiments, and as shown in FIG. 6, the shielding member 622 may be a hollow body having a cooling manifold 638 and cooling channels 640 formed therein. The cooling manifold 638 may be a groove or pocket to receive cooling air from a cooling source 630, similar to that shown and described above. The shielding member 622 may include cooling apertures distributed along the axial length of the shielding member 622 and arranged to allow air within the cooling channels 640 to enter the protected space(s) 626. Thus, cooling air may be directed into the protected space(s) and cool the material of the elastomer body 606. Similar to that described above, the shielding member 622 is a full-hoop, circumferential body that can provide thermal protection (and cooling) to the elastomer body 606 of the elastomer isolation seal 600.

In this embodiment, the material of the shielding member 622 may be selected to allow bending that may be caused by relative movement of the first and second case structures 602, 604. In some embodiments, the shielding member 622 is formed from metal. In some embodiments, in the configuration shown in FIG. 6, or on other embodiments described herein, a portion of the shielding member 622 may optionally be coated with a thermal barrier coating, to further protect and shield the elastomer isolation seal 600.

Figure 7:
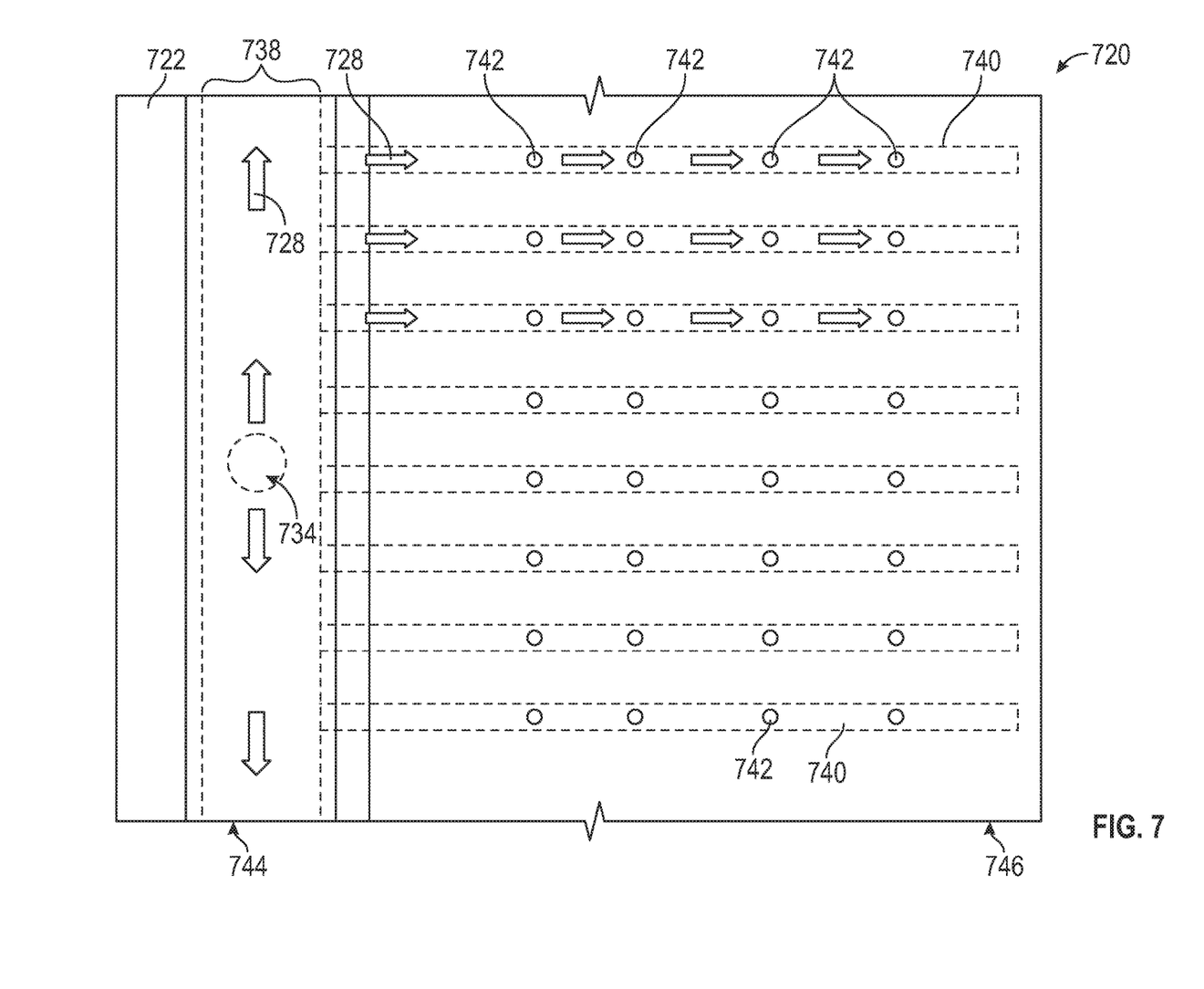
FIG. 7 is a schematic plan view illustration of a seal shield in accordance with an embodiment of the present disclosure.

Turning now to FIG. 7, a schematic illustration of a seal shield 720 in accordance with an embodiment of the present disclosure is shown. The illustration of FIG. 7 is a radially outward plan view of the structure of the seal shield 720. The seal shield 720 includes a shielding member 722 that is mountable or attachable to a case structure, as shown and described above. The seal shield 720 may be attachable at a first end 744 to a first case structure and a second end 746 may be free to contact but not connect to a second case structure. The second end 746 may have a secondary seal attached thereto to allow for engagement with a second case structure, with the secondary seal, in some embodiments, being perforated to allow air therethrough.

The shielding member 722 defines a cooling manifold 738 proximate the first end 744. The cooling manifold 738 is configured to receive cooling air 728 through one or more cooling supply apertures 734 which may be distributed about a circumference of the shielding member 722 at the first end 744. Extending from the first end 744 toward the second end 746 are one or more cooling channels 740. The cooling air 728 will flow into the cooling manifold 738 and into the cooling channels 740. The cooling air 728 may then exit the cooling channels 740 and enter a protected space that is defined, in part, by the shielding member 722 (and an elastomer isolation seal, as described above). The cooling channels 740 may have one or more cooling apertures 742 arranged along the length thereof, with the cooling apertures 742 configured to direct cooling air into one or more protected spaced, defined in part by the shielding member 722.

Figure 8:
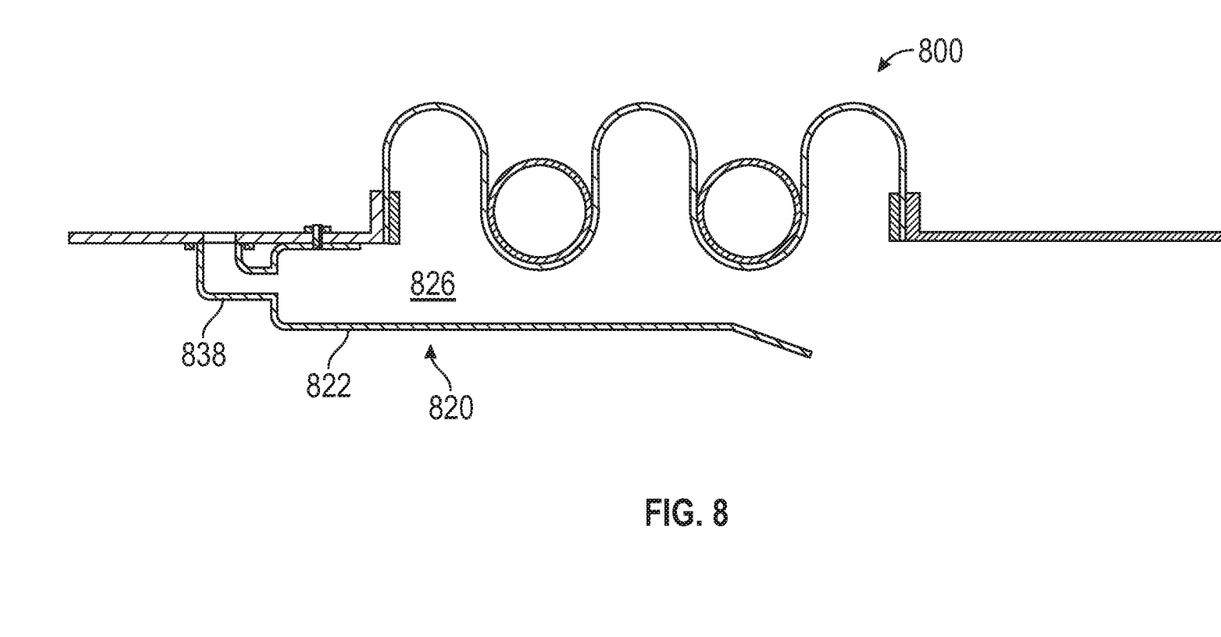
FIG. 8 is a schematic illustration of an elastomer isolation seal and seal shield in accordance with an embodiment of the present disclosure.

FIG. 8 is a schematic illustration of an embodiment of a seal shield 820 having a shielding member 822 arranged to thermally protect an elastomer isolation seal 800. The elastomer isolation seal 800 of FIG. 8 may be substantially similar to that shown and described above, and thus similar features and/or structures may not be labeled and/or described again, for clarity and ease of description. This embodiment combines features of earlier described embodiments. Specifically, as shown, the shielding member 822 includes a cooling manifold 838 that is arranged to supply cooling air into a protected space 826 defined by the shielding member 822. Other features of the arrangement shown in FIG. 8 are substantially similar to that shown and described above.

Although shown and described above with respect to an engine case and an exhaust nozzle, those of skill in the art will appreciate that embodiments of the present disclosure are not so limited. Gas turbine engines may include other connections or similar connections, without a specific engine case or exhaust nozzle as a discrete part of the connection. That is, embodiments of the present disclosure are directed to a joining of a first case structure to a second case structure were relative movement therebetween is desired, while maintaining a seal. As such, the above described engine case is equivalent to a first case structure with the seal shield mounted thereto. The seal shield has a shielding member that extends toward and may, in some embodiments, contact a second case structure.

Advantageously, elastomer isolation seals of the present disclosure can provide for improved performance of gas turbine engines, even at increased operating temperatures. That is, the seal shields described herein enable the use of elastomer isolation seals without risk of material fatigue and/or failure due to high operating temperatures. In accordance with embodiments of the present disclosure, an isolation seal may be shielded or thermally protected from high temperature air by a cooling stream within a protected space defined, in part, by the isolation seal and a seal shield. The cooling air may flow across or otherwise contact an elastomer isolation seal to provide cooling thereto. The seal shield is installed and arranged to not impede the operation and deflection absorption provided by the isolation seal in a connection between two case structures.

Embodiments described herein enable improved and advanced engine/exhaust applications to be mounted independently to an air vehicle. The elastomer isolation seal is a lightweight sealing solution for an interface which must absorb deflections in all six degrees of freedom. The elastomer isolation seals of the present disclosure can also reduce overboard leakage to nearly zero, improving thrust and TSFC. Further, advantageously, heavier, metal isolation seals may be avoided or entirely replaced with embodiments of the present disclosure.

In some embodiments described here, an elastomeric isolation seal is configured to operate at relatively higher bypass flow temperatures (i.e., high temperature operation of a gas turbine engine). In some such embodiments, an air-cooled flow guide (e.g., manifold and channels) is provided to create a lower temperature environment for the elastomer isolation seal to operate in. This environment is created by flowing air that is cooler than the local bypass temperature at a pressure that is equal or higher than the local condition. The cooling air may be extracted from any location. However, as an example, the cooling air may be extracted from a bypass flow at a location forward of a heat exchanger array that introduces both heat addition and pressure loss to the bypass flow. Further, other possible sources include environmental control system (ECS) air cycle machine discharge or fan bypass bleed cooled through auxiliary airframe supplied heat exchangers such as ram air coolers.

Accordingly, advantageously, embodiments described herein enable the use of light-weight, low-leakage elastomeric isolation seals with an ability to withstand relative motion and survive in a higher temperature environment. In addition to creating a suitable thermal environment, embodiments described herein enable a smooth aerodynamic flowpath for bypass flow (i.e., eliminates local possible recirculation zones related to undulations of an elastomer isolation seal). Further, in some configurations, a diverter for upstream fluids (e.g., fuel, oil) is provided. For example, the above described flow director portion may prevent such upstream fluids from entering and interacting with the elastomer isolation seal. These fluids may degrade the properties of the elastomer over time, and thus avoidance thereof can improve the life of the elastomer isolation seal. Furthermore, advantageously, embodiments described here may provide a radiation shield to protect the elastomeric isolation seal from heat radiated from adjacent liners or exhaust structure after engine shutdown.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An isolation seal for a gas turbine engine, the isolation seal comprising:
an elastomer body configured to be attached to a first case structure at a first end and a second case structure at a second end; and
a seal shield configured to be attached to the first case structure, the seal shield having a shielding member configured to define a protected space between the shielding member and the elastomer body,
wherein the shielding member comprises a hollow body having a cooling manifold and cooling channels extending a length of the shielding member along the protected space with a plurality of cooling apertures configured to direct a cooling flow from the cooling channels out through the cooling apertures into the protected space and direct said cooling flow at the elastomer body.

2. The isolation seal of claim 1, further comprising a reinforcement band configured to support and retain the elastomer body.

3. The isolation seal of claim 1, wherein the shielding member has a flow director portion on an end thereof.

4. The isolation seal of claim 1, wherein the elastomer body is formed from at least one of room-temperature-vulcanizing silicone, silicone-based material, multi-directional fiber layer reinforced structure, or rubber impregnated fabric.

5. The isolation seal of claim 1, wherein the shielding member is formed from at least one of titanium alloy, nickel alloy, cobalt alloy, or stainless steel.

6. A gas turbine engine comprising:
a first case structure;
a second case structure;
an elastomer isolation seal arranged between the first case structure and the second case structure and provide sealing engagement therebetween, the elastomer isolation seal having an elastomer body; and
a seal shield attached to the first case structure, the seal shield having a shielding member configured to define a protected space between the shielding member and the elastomer body,
wherein the shielding member comprises a hollow body having a cooling manifold and cooling channels extending a length of the shielding member along the protected space with a plurality of cooling apertures configured to direct a cooling flow from the cooling channels out through the cooling apertures into the protected space and direct said cooling flow at the elastomer body.

7. The gas turbine engine of claim 6, further comprising a reinforcement band configured to support and retain the elastomer body.

8. The gas turbine engine of claim 6, wherein the shielding member has a flow director portion on an end thereof.

9. The gas turbine engine of claim 6, further comprising:
a cooling source; and
a cooling supply aperture formed in the first case structure, wherein the cooling supply aperture defines a fluid connection between the cooling source and the protected space.

10. The gas turbine engine of claim 9, wherein the cooling source is a bypass duct of the gas turbine engine at a location upstream of a combustor section.

11. The gas turbine engine of claim 6, wherein the shielding member extends from the first case structure to the second case structure.

12. The gas turbine engine of claim 11, further comprising a secondary seal arranged between the shielding member and the second case structure.

13. The gas turbine engine of claim 12, wherein the secondary seal is a perforated finger seal.

14. The gas turbine engine of claim 6, wherein the elastomer isolation seal is connected to the first case structure at a first attachment structure and to the second case structure at a second attachment structure.

15. The gas turbine engine of claim 14, wherein the seal shield is attached to the first case structure at the first attachment structure.

16. The gas turbine engine of claim 6, wherein the first case structure is an engine case and the second case structure is an exhaust nozzle.

* * * * *